US012596071B2

(12) United States Patent
Huhse et al.

(10) Patent No.: US 12,596,071 B2
(45) Date of Patent: Apr. 7, 2026

(54) FCS METHOD

(71) Applicant: Carl Zeiss Microscopy GmbH, Jena (DE)

(72) Inventors: Dieter Huhse, Jena (DE); Stanislav Kalinin, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 144 days.

(21) Appl. No.: 18/449,249

(22) Filed: Aug. 14, 2023

(65) Prior Publication Data

US 2024/0060894 A1 Feb. 22, 2024

(30) Foreign Application Priority Data

Aug. 15, 2022 (DE) ..................... 10 2022 208 445.4

(51) Int. Cl.
G01N 21/64 (2006.01)
(52) U.S. Cl.
CPC . G01N 21/6428 (2013.01); G01N 2021/6439 (2013.01); G01N 2201/12 (2013.01)
(58) Field of Classification Search
CPC ........... G01N 21/6428; G01N 21/6458; G01N 21/6408
See application file for complete search history.

(56) References Cited

U.S. PATENT DOCUMENTS 4,018,530 A * 4/1977 Hirschfeld ......... G01N 21/6408
356/326
7,154,602 B2 12/2006 Wachsmuth 9,567,374 B2 2/2017 Pasquier et al.
2004/0257562 A1 * 12/2004 Wachsmuth ....... G01N 21/6458
356/317

(Continued)

FOREIGN PATENT DOCUMENTS

DE 10327531 11/2006
WO 2005/080945 9/2005

OTHER PUBLICATIONS

Bergter et al., "Follow dynamic biological processes and reveal spatial molecular characteristics", ZEISS Dynamics Profiler, Jun. 2023, pp. 1-15.

(Continued)

*Primary Examiner* — Kara E. Geisel
(74) *Attorney, Agent, or Firm* — Grüneberg Global IP, PLLC

(57) ABSTRACT

The invention relates to an FCS method in which a sample that is to be measured and has fluorescent markers is illuminated with excitation radiation over a bleaching time in order to bleach selected fluorescent markers; and after bleaching has been carried out over at least one measurement period, FCS measurement data of the sample are acquired by illuminating the sample with excitation radiation and by detecting detection radiation brought about by the excitation radiation. The invention is characterized in that during the bleaching time, intensity values of fluorescence radiation that has been brought about by the excitation radiation which is directed at the sample for bleaching purposes are continuously or repeatedly acquired and compared with a threshold value, and the acquisition of the FCS measurement data is started when the threshold value has been reached.

20 Claims, 5 Drawing Sheets

(56)         References Cited

U.S. PATENT DOCUMENTS

2014/0256573 A1*  9/2014  Durand ............ B01L 3/502753
                                                435/5
2017/0096459 A1    4/2017  Aldea Malo et al.

OTHER PUBLICATIONS

Joseph Huff, "The Airyscan detector from ZEISS: confocal imaging with improved signal-to-noise ratio and super-resolution", Nature methods, Dec. 2015, 2 pages.
Moertelmaier et al., "Thinning out clusters while conserving stoichiometry of labelling", App. Phys. Letters. vol. 87, 2005, pp. 263903-1-263903-3.
Scipioni et al., "Comprehensive correlation analysis for super-resolution dynamic fingerprinting of cellular compartments using the Zeiss Airyscan detector", Nature Communications, vol. 9, 5120, 2018, pp. 1-7.

* cited by examiner

414

414

FCS METHOD

CROSS-REFERENCE TO RELATED APPLICATIONS

This application claims priority to German Application No. 102022208445.4 filed on Aug. 15, 2022, the content of which is hereby incorporated by reference in its entirety.

BACKGROUND OF THE INVENTION

Field of the Invention

The invention relates to a fluorescence correlation spectroscopy method (FCS method) according, to the description below.

Description of Related Art

Fluorescence correlation spectroscopy (FCS) is a method in the field of confocal scanning microscopy, especially confocal laser scanning microscopy, which has proven its worth, for example for examining the dynamics of the behavior of molecules in cells.

By way of example, when a laser scanning microscope (LSM) is used, it is possible to ascertain the diffusion of a fluorescence-labeled molecule or an autofluorescing molecule into and out of the confocal volume of the LSM. The acquisition of FCS measurement data is disrupted by bleaching of immobile molecules. Such molecules do not diffuse freely but remain fixed at a measurement point because they are bound, for example, to a biological structure.

Such disturbing bleaching effects can be reduced in various ways. In one approach, immobile molecules are deliberately bleached by a user of the FCS method before the actual measurement by illuminating the corresponding sample site with excitation radiation over a period of time (e.g. 10 seconds), which is usually selected based on experience, before the actual acquisition of FCS measurement data. The wavelength of the excitation radiation is chosen such that the sufficiently strongly illuminated molecules permanently lose their ability to emit fluorescence radiation, i.e. are bleached.

Such bleaching is done, for example, by the user performing a series of ten repeated FCS measurements of 10 seconds each and then discarding the first measurement or the first two measurements and not further evaluating them. The disadvantage of this procedure is that the user needs a lot of experience to choose the correct bleaching times. Otherwise, the bleaching times must be selected with a sufficiently large time safety buffer, which unnecessarily lengthens the FCS measurement process.

Alternatively, it is known to remove the disturbing bleaching subsequently from acquired FCS measurement data by means of suitable mathematical filters (DE 103 27 531 B4). The disadvantage of this is that the FCS measurement data are changed in the process and thus, if necessary, the measurement results are falsified unintentionally. In addition, the filters must he suitably parameterized, which entails a great deal of complexity.

SUMMARY OF THE INVENTION

The invention is based on the object of proposing an option for reducing undesired bleaching effects and for carrying out an FCS method efficiently that is improved with respect to the prior art.

The object is achieved by an FCS method which comprises the following steps. A sample to be measured having fluorescent markers is illuminated with excitation radiation in order to bleach at least a portion of the fluorescent markers. By selecting the wavelength or wavelength range of the excitation radiation and also its intensity and illumination duration, bleaching can be adapted to the known or expected molecules to be bleached (fluorescent markers) and their properties, and the molecules to be bleached can be selected. After bleaching, FCS measurement data of the sample are acquired over at least one measurement period by continuing to illuminate the sample with the excitation radiation used so far or with excitation radiation having a different wavelength. Fluorescence radiation emitted due to the effect of the excitation radiation is detected as detection radiation, and the FCS measurement data are ascertained. Characteristic of the method according to the invention is that during bleaching, intensity values of fluorescence radiation that has been brought about by means of the excitation radiation which is directed at the sample for bleaching purposes are continuously or repeatedly acquired and compared with a threshold value. As a result of the bleaching, the intensity values decrease starting from an initial intensity. If the intensity values reach the threshold value, the acquisition of the FCS measurement data is started.

The core idea of the invention is, in particular, to bring about and optionally document the starting conditions for performing the procedure of an FCS method efficiently and in a controlled and comprehensible manner. By means of the invention, the comparability of several FCS measurements even over different samples is improved. In addition, unnecessary loads on a sample and idle times of the experiment arrangements are avoided and equipment utilization is improved.

When measurement values of the sample are acquired during bleaching (bleaching time), they are referred to as intensity values below. In contrast, FCS measurement data are data that are acquired from the sample after bleaching has taken place and represent the actually desired data of the FCS method.

The term fluorescent markers refers in general to fluorophores, molecules labeled with fluorophores, and molecules capable of emitting fluorescence radiation themselves.

The threshold value can be set by adding to an offset ascertained by the initial intensity and the bleaching behavior of the fluorescent markers a fraction of the offset. For example, a threshold value can be set by adding a value of 0.5%, 1%, 2%, or up to 5% of the offset to the offset.

In a further procedure, a state of the sample starting from which the intensity values change during bleaching by only a defined small amount or percentage per unit time (rate of change) is ascertained. The acquired intensity values then fluctuate by an unchanging value or approach it (offset or limit value).

Such a state can be ascertained in a possible embodiment of the method by adapting a decay function to the acquired intensity values of the fluorescence radiation that has been caused in order to determine or predict, temporally and/or in absolute terms, the reaching of the threshold value. The offset can be ascertained as a limit value by calculating it based on the decay function or by estimating or predicting it based on the behavior of the decay function during the continuous adaptation to the intensity values (fitting).

An example of such a decay function is $$\text{Intensity } (t) = A \cdot e^{\frac{-t}{\tau}} + \text{Offset} \qquad 1)$$

where:

A refers to the output intensity of the bleachable portion of the signal,

Offset refers to the intensity of the non-bleachable portion of the signal (i.e. the actual FCS signal), t refers to time and T refers to the time constant of the bleaching process.

Bleaching stops when the current intensity deviates by less than, for example, 5% from the offset value. The threshold value would then be $$\text{Threshold value } Sw = \text{Offset} + (\text{Offset}/100)*5 \qquad 2)$$

In order to be able to use an existing optical system for carrying out the method according to the invention, the intensity values during bleaching and the FCS measurement data can be acquired with the same detector in an advantageous embodiment.

It is advantageous here if an array with a number of detector elements is used as the detector. Advantageously, the detector elements can be read either individually or together. For example, an Airyscan detector (Huff, 2015, Nature Methods; Application Notes, December 2015, and Scipioni et al., 2018; Nature Communications; DOI: 10.1038/s41467-018-07513-2) or a SPAD detector array (single-photon avalanche diode) can be used. Such detectors may be arranged, for example, in an intermediate image plane of the detection beam path, wherein each of the detector elements acts as a pinhole stop (pinhole).

Such a design of the detection beam path enables the detector elements of the detector array used to be interconnected during bleaching and to be read additively. In this way, the change in intensity values can be ascertained with a high sensitivity. During the acquisition of the FCS measurement data, however, the detector elements are either read and evaluated individually, or previously defined groups of detector elements are read, as described below.

In addition to ascertaining the threshold value, the application of a decay function can also be used to ascertain filter parameters for downstream processing of the acquired measurement data. For example, filter parameters can be derived as are used in methods according to DE 103 27 531 B4.

In addition or as an alternative to the method according to the invention, detrending can be carried out. In the course of the implementation of the FCS method, FCS measurement data (intensity profiles, intensity traces) recorded over a measurement period and each time offset are evaluated using autocorrelation (temporal autocorrelation). The correlation functions obtained in this way can be adapted to mathematical models with which a dynamic behavior of fluorescent markers is described. The correlation curves allow, for example, conclusions to be drawn about the diffusion time and the concentration of the fluorescent markers (see, for example, DE 20 2023 103 998). If bleaching occurs at the same time during the measurements, the correlation curves do not converge towards one.

However, when FCS measurement data is collected and subsequent adjustments and analyses are made, it is usually assumed that no bleaching occurs.

If fluorescence markers are bleached during the measurements, this effect can be reduced by detrending. For this purpose, a correction value (detrending value; filter parameter in [ms]) can be selected, through the effect of which the correlation functions converge again towards one. The correction value should be significantly larger than the diffusion time.

A possible procedure for detrending is briefly outlined below (detrending filter). A detrended signal $I_d(t)$ can be calculated as follows:

$$I_d(t) = \frac{Id(t)}{Tr(t)} \qquad 3)$$

Where the trend Tr(t) is a Gaussian filter smoothed signal of the form.

$$Tr(t) = I(t) \odot e^{\frac{-t^2}{2\sigma^2}} \qquad 4)$$

Where $\sigma$=filter parameter/4. The filter parameter is specified by a user.

The advantages of the invention lie in an automated evaluation of the bleaching process and its standardization. A user optionally specifies only the threshold value or its relation to the output intensity and/or to an existing offset. The invention permits improved equipment utilization and operation thereof also by users whose wealth of experience regarding the respective samples and the FCS method is still being gathered.

The invention also includes the following embodiments:

1. Fluorescence correlation spectroscopy method, wherein a sample (48) that is to be measured and contains fluorescent markers is illuminated with excitation radiation over a bleaching time (B) in order to bleach selected fluorescent markers;

after bleaching over at least one measurement period (FCS_int; FCS_total), FCS measurement data of the sample (48) are acquired by illuminating the sample with excitation radiation and by detecting detection radiation brought about by the excitation radiation; characterized in that during the bleaching time (B), intensity values of fluorescence radiation that has been brought about by means of the excitation radiation which is directed at the sample (48) for bleaching purposes are continuously or repeatedly acquired and compared with a threshold value (Sw); and when the threshold value (Sw) has been reached, the acquisition of the FCS measurement data is started.

2. Method according to embodiment 1, characterized in that the threshold value (Sw) is set on the basis of a maximum permissible rate of change in the intensity values of the detection radiation per unit time.

3. Method according to either of the preceding embodiments, characterized in that a decay function (ZF) is adapted to the acquired intensity values of the fluorescence radiation caused in order to predict a reaching of the threshold value (Sw).

4. Method according to embodiment 3, characterized in that the threshold value (Sw) is set by ascertaining a limit value of the decay function (ZF) on the basis of the decay function (ZF) (offset) and adding to the offset a value of 0.5%, 1%, 2% or up to 5% of the offset.

5. Method according to any of the preceding embodiments, characterized in that the intensity values are acquired during the bleaching time (B) and the FCS measurement data during the measurement period (FCS$_{int}$; FCS$_{total}$) using the same detector (414).

6. Method according to embodiment 5, characterized in that a detector array with a plurality of detector elements (1 to 31, 32) is used as the detector (414).

7. Method according to embodiment 6, characterized in that the detector elements (1 to 31, 32) of the detector (414) used are connected and additively read during the bleaching time (B); a are read individually or in predefined groups and evaluated during the acquisition of the FCS measurement data during the measurement period (FCS$_{int}$; FCS$_{total}$).

8. Method according to embodiment 3, characterized in that filter parameters for downstream processing of the acquired measurement data are ascertained on the basis of the decay function (ZF).

BRIEF DESCRIPTION OF THE DRAWINGS

The invention is explained in more detail below on the basis of exemplary embodiments and drawings, in which.

Figure 1:
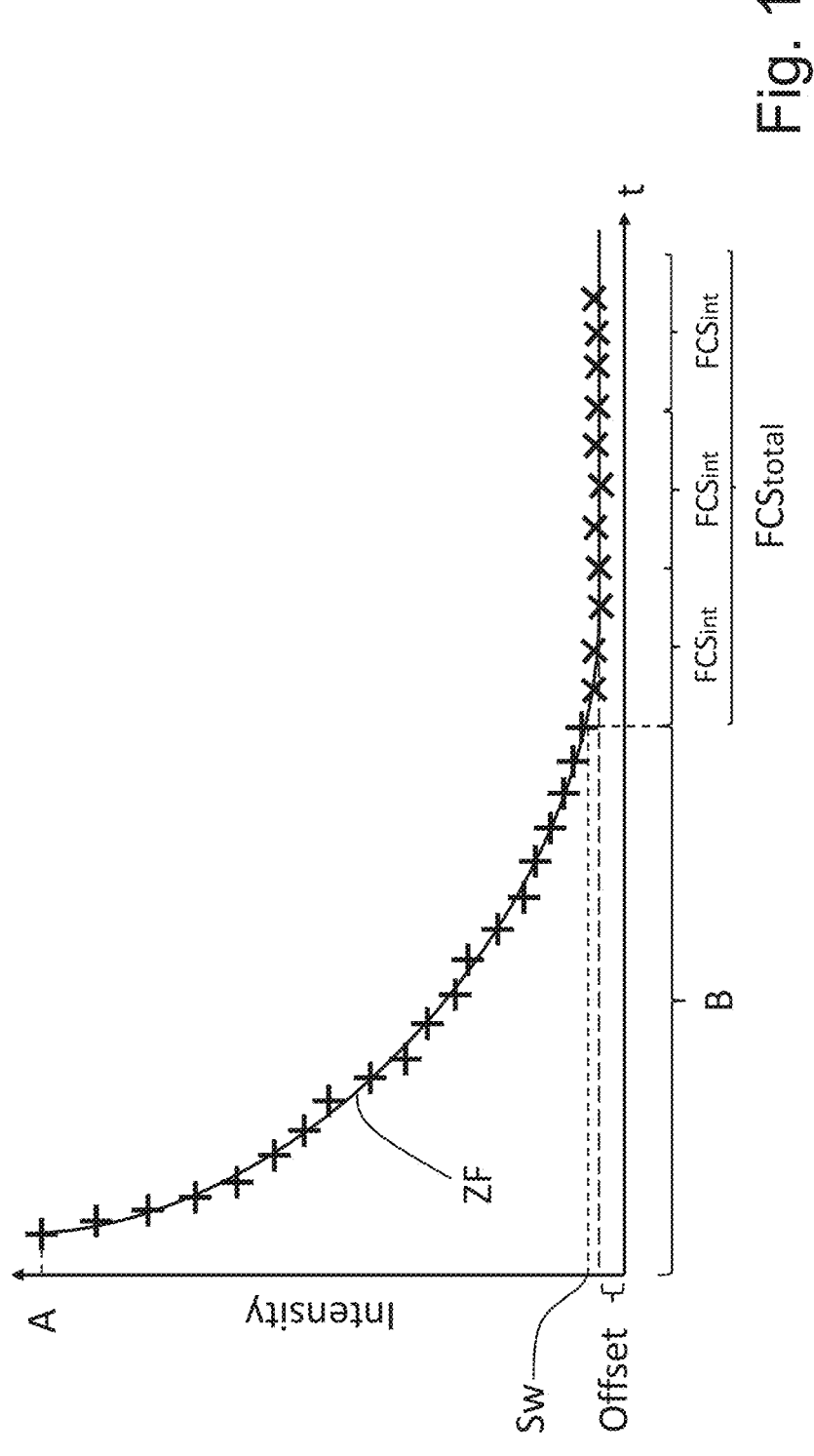
FIG. 1 shows a schematic illustration of an example of the profile of a decay function over time (decay curve) during a bleaching process in preparation of an FCS measurement.

The drawings are much simplified and are restricted in the illustration to the technical elements required for the explanation. The beam paths have likewise been shown in much simplified fashion.

DETAILED DESCRIPTION OF THE INVENTION

Before starting an FCS measurement, a sample 48 to be examined is illuminated with excitation radiation having a suitable wavelength (see FIG. 2) in order to reduce existing unwanted fluorescence events. This causes an emission of fluorescence radiation in the sample 48.

During the time period B (bleaching time B) of this so-called bleaching, the resulting fluorescence is recorded in the form of intensity values (illustrated by plus signs, for example). An initial intensity A acquired at the beginning of the bleaching process quickly decreases over the bleaching time B. The temporal profile of the acquired intensity values is described by means of a decay function ZF. The decay function ZF is advantageously dynamically adapted to the already acquired and the newly added intensity values ("fitting"), for example, by applying the approach of minimizing the sum of squared deviations.

The decay function ZF decreases exponentially at the beginning of bleaching and approaches a limit value (offset). In order to define a threshold value Sw within the meaning of the present invention, for example, a rate of change in the intensity per unit time from which the bleaching process is completed and the FCS measurement is started can be defined. It is also possible to define the threshold value Sw as a permissible deviation from the limit value. For example, the threshold value Sw can be set as Sw=Limit value+(Limit value/100)n; with n=1, 2, . . . , 5.

When the threshold value Sw is reached, the acquisition of measurement values of the FCS measurements begins (each shown as a cross). These are performed, for example, at successive intervals FCS$_{int}$, which in turn can be combined into a complete KS measurement FCS$_{total}$.

An exemplary embodiment of an apparatus for acquiring brightness information of a sample 48 (FIG. 2) comprises a light source 41, for example a laser light source, from which a beam of excitation radiation is emitted and guided along an excitation beam path 42. Optional optical elements for shaping and/or collimation of the excitation radiation are not shown. In the excitation beam path 42, a means 44 is optionally arranged for the controlled change of an extent of the beam, which in the exemplary embodiment is in the form of a stop which is settable in a controlled manner. In further embodiments, a turret or a slide can also be present by means of which different stops can be introduced into the excitation beam path 42. Alternatively, the means 44 can also be a telescope which is settable in a controlled manner or an acousto-optic element.

The means 44 can be moved out of the excitation beam path 42 by means of a drive 416 (indicated with an interrupted full line) to effect different numerical apertures, within whose respective angle ranges the excitation radiation can be directed into a sample 48 to be imaged. The means 44 may be settable in further embodiments with regard to its transmissivity for the excitation radiation, in particular with regard to a hole diameter (pinhole, iris diaphragm) or the length and width of a slit (settable slit aperture, acousto-optic element).

After passing through the means 44, the excitation radiation is incident on a main color splitter 43, which is transmissive to the excitation radiation and allows it to pass. Downstream of the main color splitter 43, the excitation radiation passes through a section of the beam path of the apparatus which is referred to as the common beam path 4210 and along which the excitation radiation and detection radiation (see below) are guided together or can be guided together.

By means of a scanner 46 arranged thereafter, the beam of the excitation radiation which was previously deflected by means of a mirror 45 can be deflected in a controlled manner and be directed into the entrance pupil EP of an objective 47. The mirror 45 allows a compact design and may be missing in further versions of the apparatus if no deflection of the excitation beam path 42 is required or envisaged.

The excitation radiation, which is set by the effect of the means 44 in its lateral extent and deflected by means of the scanner 46 in a controlled manner, is focused by the effect of the objective 47 in a sample space in which the sample 48 to be imaged may be present on a sample stage 49. Owing to the excitation radiation being focused in this way, a confocal excitation volume is produced in interaction with the respective groups of detector elements 1 to 31 or 32 (see FIGS. 3 to 8).

Detection radiation brought about in the sample 48 by the excitation radiation in the confocal excitation volume is detected with the objective 47 and guided along a detection beam path 410 (shown with broken full lines), which coincides with the excitation beam path 42 up to the main color splitter 43 (common beam path 4210).

In further embodiments of the apparatus according to the invention, the detection radiation can be detected by means of a further objective (not shown). In such a case, the excitation beam path 42 and the detection beam path 410 can be completely separated from each other or they are combined again, for example by means of a further color splitter (not shown), to form the common beam path 4210.

In the illustrated exemplary embodiment, the detection radiation is converted into a resting beam as a consequence of passing through the scanner 46 ("descanned") and reaches the main color splitter 43. The latter is reflective to the wavelength of the detection radiation, which differs from the wavelength of the excitation radiation. The detection radiation reflected at the main color splitter 43 reaches a zoom unit 411 optionally present in the detection beam path 410. The zoom unit 411 is settable by means of a zoom drive 412. In further embodiments, the transmissivity and the reflectivity of the main color splitter 43 may also be implemented in reverse, with the result that the excitation radiation is reflected and the detection radiation is allowed to pass through. The beam paths 42 and 410 must then be designed accordingly.

The means 44, the scanner 46, the zoom drive 412 and the drives 415 and 416 and optionally the light source 41 are suitably connected to a control unit 413 for exchanging data and control commands. By way of example, the control unit 413 is a computer or a suitable control circuit. The control unit 413 is designed for generating control commands. By way of example, these control commands serve to control the light source 41, the means 44, the scanner 46, the zoom drive 412 and/or an optional drive 415 of the sample stage 49.

The control unit 413 is additionally configured to carry out the method according to the invention. In this case, the control unit 413 receives the acquired intensity values during the bleaching time B and evaluates them by ascertaining if the threshold value Sw is approached or reached. In addition, the control unit 413 can control the light source 41 in such a way that the wavelengths and/or the intensities of the excitation radiation during the bleaching time B or during the duration of the FCS measurements $FCS_{total}$ and $FCS_{int}$ are set accordingly and, if necessary, controlled in a closed loop. In addition, the acquired intensity values and/or the acquired measurement values of the FCS measurements $FCS_{int}$, $FCS_{total}$ can be stored. These acquired data are optionally assigned to one another and stored in a memory so as to be able to be retrieved repeatedly, with the result that the associated data of the bleaching process and/or the setting of the threshold value Sw can also be documented during subsequent evaluations of the FCS measurement values.

The zoom unit 411 is a means for the controlled change of an extent of the beam of the detection radiation which can be used to adapt the extent of a beam of the detected detection radiation to the size of a detection area of a spatially resolving detector 414 that is likewise arranged in the detection beam path 410 in an intermediate image ("pinhole plane"). The aim is to light the detection area as completely as possible. Accordingly, the detection radiation is directed at the detector 414 by means of the zoom unit 411 and adapted with regard to the extent of its beam by means of the zoom drive 412.

FIGS. 3 to 8 illustrate by way of example steps and refinements of an FCS method in which the steps of bleaching and of ascertaining the threshold value Sw precede the acquisition of the FCS measurement values and have already been completed.

Figure 3:
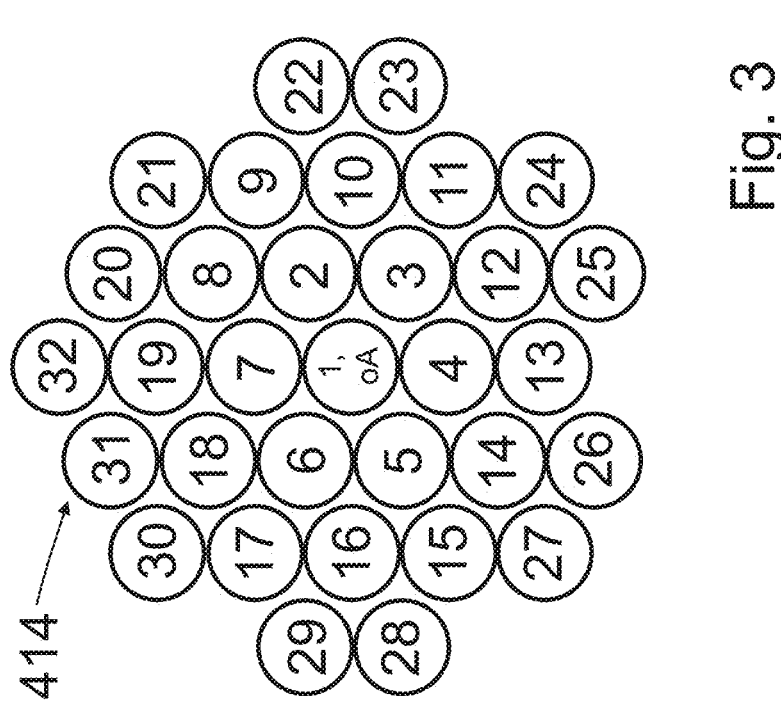
FIG. 3 shows a schematic illustration of an Airyscan detector with an exemplary numbering of the detector elements.

FIG. 3 schematically shows the top view of the detection area of an Airyscan detector, which can be used as a spatially resolving detector 414. The brightness information of detector elements 1 to 32 can be read individually and can also be combined with one another as desired ("binning"). The extent of the beam of the detection radiation can be selected such that it is incident on the detection area with 1.25 Airy units (AU). For example, each of the detection elements 1 to 32 can detect a section of 0.2 AU. The central detector element designated with the reference sign "1" is located on the optical axis oA of the detection beam path 410.

Figure 4:
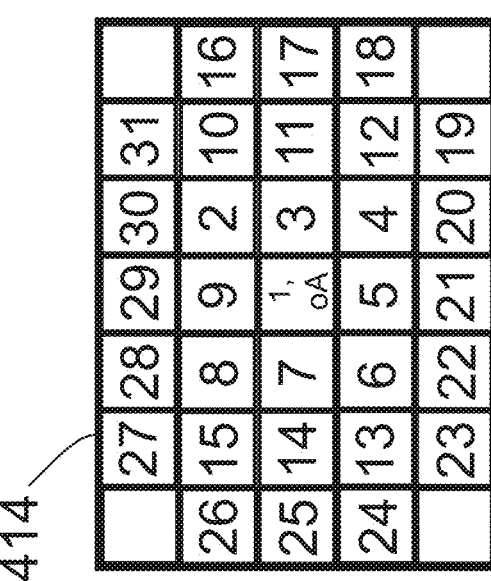
FIG. 4 shows a schematic illustration of a spatially resolving 2D detector with an exemplary numbering of the detector elements.

FIG. 4 shows a further embodiment of a spatially resolving detector 414 in a row and column arrangement of the detector elements 1 to 31 (hereinafter also: 2D detector), as can be realized, for example, in a SPAD array, a CMOS chip or an sCMOS chip.

In the following FIGS. 5 to 8, technical facts are given on the basis of the detector elements 1 to 31 or 32 of a detector 414 of the Airyscan detector type and a detector 414 with approximately rectangular, i.e., row-wise and column-wise, arrangement of the detector elements 1 to 31. In a subsequent specification of the numbers of the particular detector elements, reference is made to FIG. 3 and to FIG. 4, respectively. The central detector element 1 is shown in the following FIGS. 5 to 8 filled with a checkerboard pattern for better clarity.

For the implementation of an FCS method, the acquired brightness information of the detector elements 1 to 32 can be selectively combined with each other by calculation. As shown in FIGS. 5 to 8 below, differently sized virtual pinhole stops (pinholes) can be generated by selectively adding up the simultaneously acquired brightness information of the detector elements 1 to 32. The brightness information of all detector elements 1 to 32 or 1 to 31 is advantageously acquired, and the virtual pinholes are generated using a targeted selection of the acquired brightness information. Acquired brightness information can of course be used for the analysis of different pinholes, which is why these are advantageously stored. For example, the brightness information of the detector element 1 is used in the evaluation of all pinholes.

Figure 6:
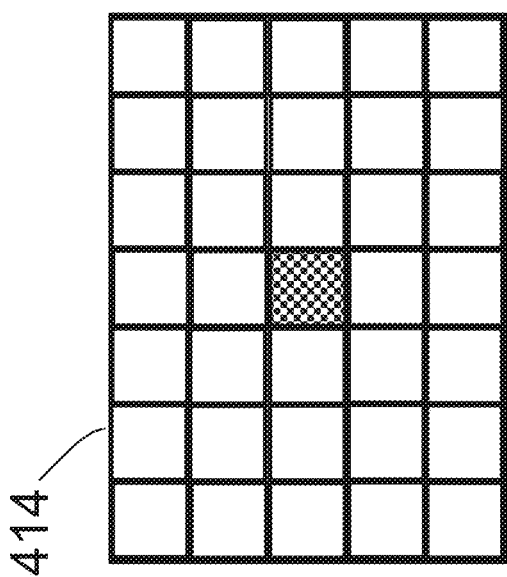
FIG. 6 shows a schematic illustration of a first group of detector elements of a 2D detector.
Figure 5:
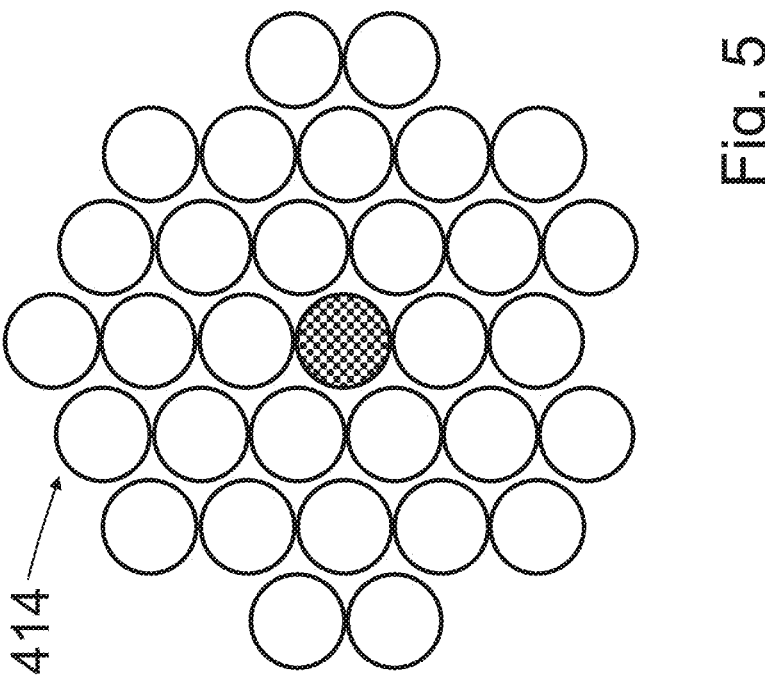
FIG. 5 shows a schematic illustration of a first group of detector elements of an Airyscan detector.

For the simulation of a pinhole with the smallest possible diameter, only the brightness information of the detector element 1 is used. This brightness information thus in each case forms a first group of detector elements of an Airyscan detector (FIG. 5) or a 2D detector (FIG. 6). The brightness information of the detector elements 1 represents a first measurement volume within a confocal excitation volume.

A selection of the detector elements 1 to 32 (Airyscan detector, FIG. 7) or the detector elements 1 to 31 (2D detector, FIG. 8) as four groups of detector elements in each case leads to the representation of a virtual pinhole with a maximum possible diameter, which allows the acquisition of brightness information of a further measurement volume.

Figure 8:
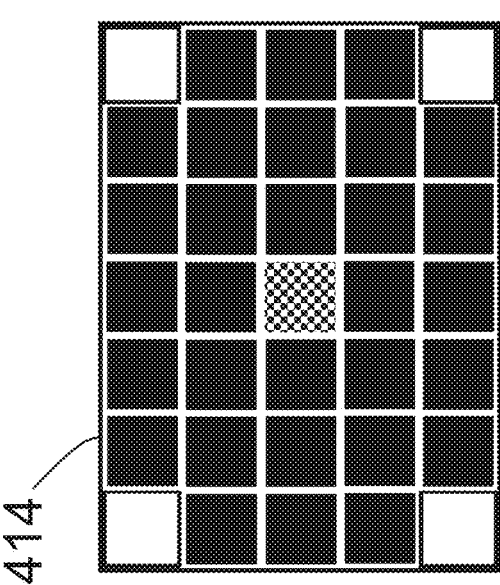
FIG. 8 shows a schematic illustration of four groups of detector elements of a 2D detector.
Figure 7:
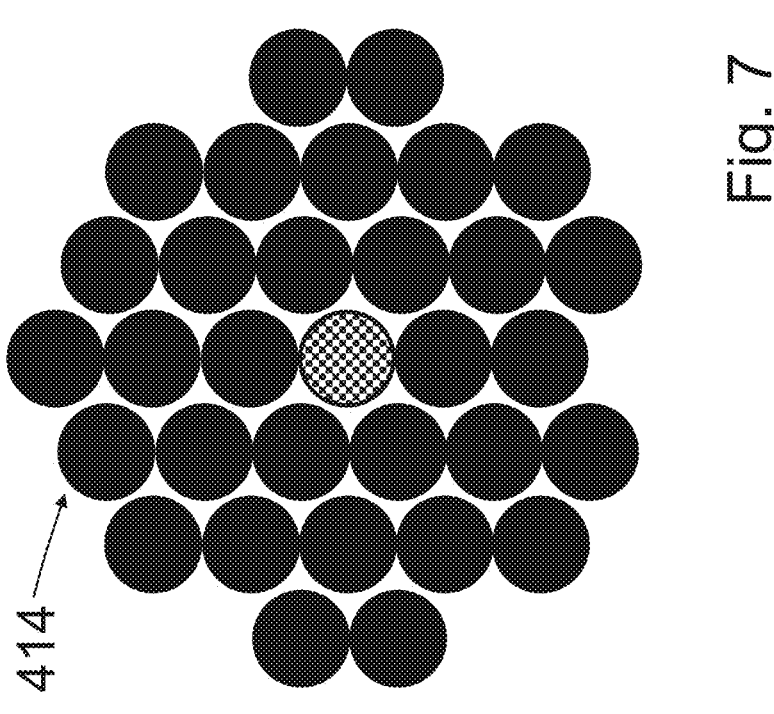
FIG. 7 shows a schematic illustration of four groups of detector elements of an Airyscan detector.

By way of example, four groups of detector elements are visualized with a pattern fill or black background. In FIG. 8 (Airyscan detector), the detector element 1 is in the first group, the detector elements 2 to 7 are in the second group, the detector elements 8 to 19 are in the third group, and the detector elements 20 to 32 are in the fourth group. In FIG. 13 (2D detector), the detector element 1 is in the first group, the detector elements 2 to 9 are in the second group, the detector elements 10 to 12, 13 to 15, 20 to 23 and 28 to 30 are in the third group, and the detector elements 16 to 19, 23 to 27 and 31 are in the fourth group.

An interconnection of the detector elements 1 to 32 or 1 to 31 (FIGS. 7 and 8) can be used both during the bleaching time B (FIG. 1) and during the acquisition of FCS measurement values.

In further refinements of the invention, the sample 48 is also bleached as described above, the threshold value is set and monitored for being reached, and the FCS measurement $FCS_{total}$ is started when the threshold value Sw has been reached. FCS measurement values can be acquired over a number of intervals $FCS_{int}$ without changing the number of read detector elements 1 to 31 or 32.

Figure 2:
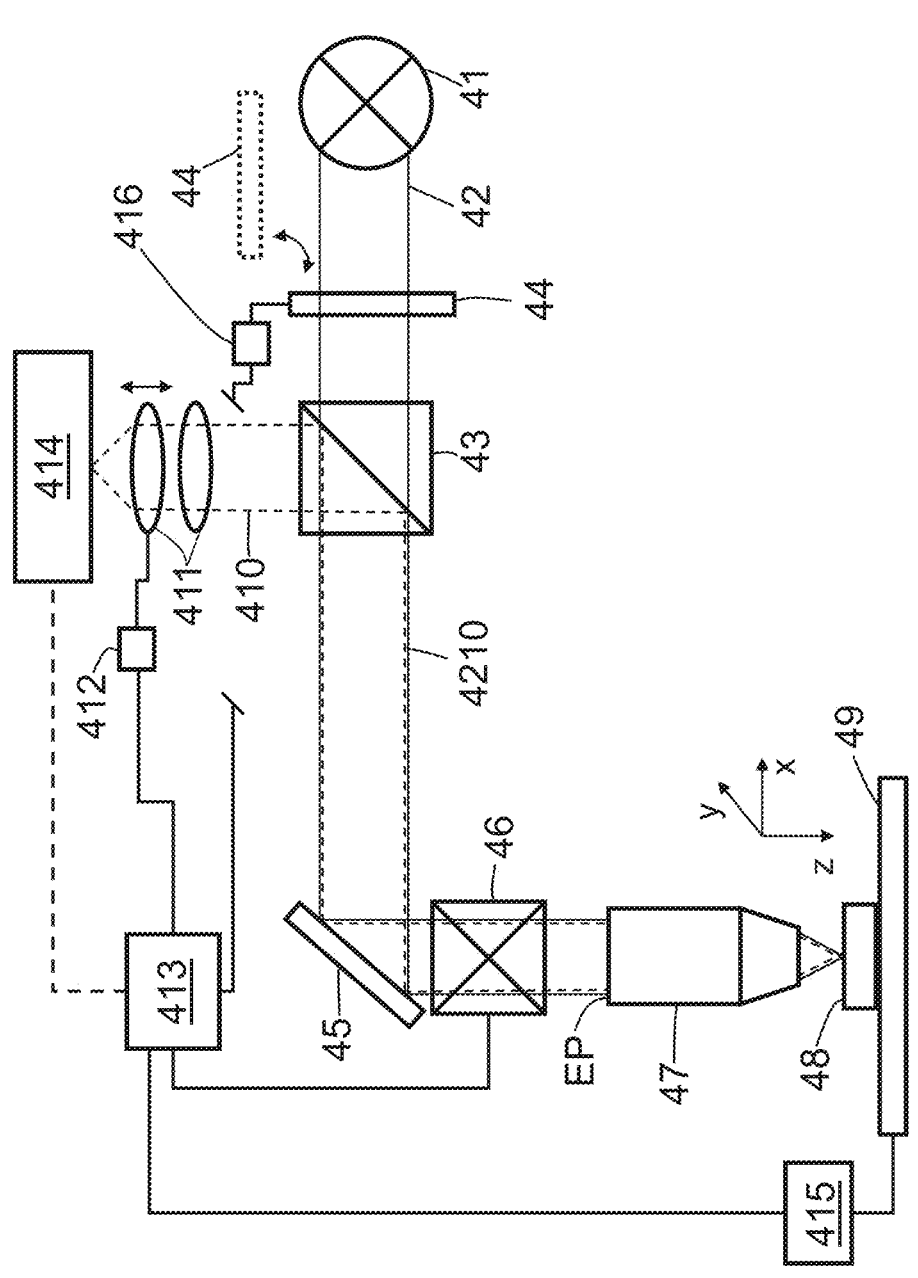
FIG. 2 shows a schematic illustration of an exemplary embodiment of an apparatus according to the invention.

In carrying out a method according to the invention using an apparatus according to the invention according to FIG. 2, a first measurement block can be carried out, as part of which four measurement volumes of the confocal excitation volume of the sample 48 are measured simultaneously. In this case, the zoom unit 411 is set, for example, such that the detection radiation is incident on the detection area of the detector 414 with 1.25 AU. Each of the four virtual pinholes described above represents a diameter of a measurement volume, wherein the diameters of the measurement volumes (spot diameters) depend on the current optical conditions of the microscope and the currently selected numerical aperture (NA) with which the excitation radiation falls into the entrance pupil EP of the objective 47 (see below).

In a step A, the sample 48 is illuminated with the focused beam of the excitation radiation using the objective 47. In the process, the excitation radiation is directed in the angle range of a first numerical aperture at and/or into the sample 48 by setting a first extent of the cross section of the beam in the entrance pupil EP of the objective 47. For this purpose, for example, the means 44 can be moved out of the excitation beam path 42 or arranged with a first setting of its free aperture in the excitation beam path 42.

In step B, the detection radiation is generated in a confocal excitation volume in the sample 48 caused by the illumination.

In step C, the detection radiation is detected below the angle range of the first numerical aperture by means of the objective 47.

The detected detection radiation is guided along the detection beam path 410 in step D and imaged onto the spatially resolving detector 414.

The brightness information of the respective members of a group of detector elements, of the totality of detector elements 1 to 31 and 1 to 32, which are in particular arranged approximately equally far from the optical axis oA is acquired and assigned to the respective detector elements or groups.

In a second measurement block, the steps A to E are repeated, wherein in step A a second extent of the beam (second NA) in the entrance pupil EP of the objective 47 is set, which is different from the first extent (first NA), in particular is lower. This directs the excitation radiation within the angle range of the second numerical aperture at and/or into the sample 48. For this purpose, for example, the means 44 can be moved into the excitation beam path 42 or arranged with a second setting of its free aperture in the excitation beam path 42.

Limiting the lateral extent of the beam of the excitation radiation results in a second numerical aperture that is smaller than the first numerical aperture, causing the size of the excitation PSF (point spread function) to be increased.

According to the selected second numerical aperture, control commands are generated by the control unit 413 and transmitted to the zoom drive 412 in order to adapt the zoom unit 411 such that a meaningful lighting of the detection area of the detector 414 is again achieved.

The actual values for example of the first and the second numerical aperture and the magnification of the zoom unit 411 brought about are advantageously selected such that measurement volumes result in the totality of optical parameters that are both sufficiently far apart and also far enough away from the measurement volumes of other measurement blocks in order to enable further meaningful measurement processes. In this way, it is possible to obtain four additional measurement volumes for the evaluation of the "spot-variation FCS" technique described here with just one further measurement process.

REFERENCE SIGNS

1 to 32 Detector elements
41 Light source
42 Excitation beam path
4210 Common beam path
43 Main color splitter
44 Means (for controlled change in the extent of the beam of the excitation radiation)
45 Mirror
46 Scanner
47 Objective
48 Sample
49 Sample stage
410 Detection beam path
411 Zoom unit
412 Zoom drive, actuator
413 Control unit
414 Detector
415 Drive (of sample stage 49)
416 Actuator, drive
EP Entrance pupil (of objective 7)
oA Optical axis (of the detection beam path 410)

The invention claimed is:

1. A fluorescence correlation spectroscopy (FCS) method, the method comprising:
   using a light source to emit excitation radiation;
   directing the excitation radiation toward a sample that contains fluorescent markers via an excitation beam path comprising an optical system configured to selectively provide at least two different numerical apertures (NAs), including:
   a first numerical aperture configured to define a first measurement volume during a bleaching phase; and
   a second numerical aperture, different than the first, configured to define a second measurement volume during a subsequent measurement phase;
   detecting fluorescence radiation emitted from the sample in response to the excitation radiation using a detector;
   operating a control unit operatively coupled to the light source, the optical system, and the detector to:
   control the optical system to apply the first numerical aperture during the bleaching phase;
   initiate the bleaching phase by controlling the light source to illuminate the sample with excitation radiation to bleach selected fluorescent markers;
   continuously or repeatedly acquire intensity values of the fluorescence radiation during the bleaching phase via the detector;

compare the acquired intensity values to a predefined threshold value; and upon determining that the threshold value has been reached, control the optical system to apply the second numerical aperture, and initiate acquisition of FCS measurement data from the sample by continuing illumination with the excitation radiation and detecting resulting detection radiation via the detector.

2. The method according to claim 1, wherein the control unit is further configured to set the threshold value on the basis of a maximum permissible rate of change in the intensity values of the detection radiation per unit time.

3. The method according to claim 1, wherein the control unit is further configured to adapt a decay function to the acquired intensity values of the fluorescence radiation during the bleaching phase in order to predict when the threshold value will be reached.

4. The method according to claim 3, wherein the threshold value is set by the control unit by ascertaining a limit value of the decay function offset and adding to the offset a value of 0.5%, 1%, 2% or up to 5% of the offset.

5. The method according to claim 1, wherein the same detector is used to acquire both the intensity values during the bleaching phase and the FCS measurement phase.

6. The method according to claim 5, wherein the detector comprises a detector array with a plurality of detector elements.

7. The method according to claim 6, wherein the plurality of detector elements of the detector are configured to be:

connected and additively read during the bleaching phase; and read individually or in predefined groups and evaluated during the acquisition of the FCS measurement data during the measurement phase.

8. The method according to claim 3, wherein the control unit is further configured to determine filter parameters for downstream processing of the acquired measurement data on the basis of the decay function.

9. A fluorescence correlation spectroscopy (FCS) system, comprising:

a light source configured to emit excitation radiation;

an excitation beam path optically coupled to the light source and configured to direct the excitation radiation toward a sample that contains fluorescent markers, the excitation beam path comprising an optical system configured to selectively provide at least two different numerical apertures (NAs), including:

a first numerical aperture configured to define a first measurement volume during a bleaching phase; and a second numerical aperture, different than the first, configured to define a second measurement volume during a subsequent measurement phase;

a detector configured to detect fluorescence radiation emitted from the sample in response to the excitation radiation;

a control unit operatively coupled to the detector, the light source, and the optical system, the control unit configured to:

control the optical system to apply the first numerical aperture during the bleaching phase;

initiate the bleaching phase by controlling the light source to illuminate the sample with excitation radiation to bleach selected fluorescent markers;

continuously or repeatedly acquire intensity values of the fluorescence radiation during the bleaching phase via the detector;

compare the acquired intensity values to a predefined threshold value; and upon determining that the threshold value has been reached, control the optical system to apply the second numerical aperture, and initiate acquisition of FCS measurement data from the sample by continuing illumination with the excitation radiation and detecting resulting detection radiation via the detector.

10. The system according to claim 9, wherein the control unit is further configured to set the threshold value based on a maximum permissible rate of change in the intensity values of the detection radiation per unit time.

11. The system according to claim 9, wherein the control unit is further configured to adapt a decay function to the acquired intensity values of the fluorescence radiation during the bleaching phase in order to predict when the threshold value will be reached.

12. The system according to claim 11, wherein the threshold value is set by the control unit by ascertaining a limit value of the decay function (offset) and adding to the offset a value selected from 0.5%, 1%, 2%, or up to 5% of the offset.

13. The system according to claim 9, wherein the same detector is configured to acquire both the intensity values during the bleaching phase and the FCS measurement data during the measurement phase.

14. The system according to claim 13, wherein the detector comprises a detector array with a plurality of detector elements.

15. The system according to claim 14, wherein the plurality of detector elements of the detector are configured to be:

connected and additively read during the bleaching phase; and read individually or in predefined groups and evaluated during the acquisition of the FCS measurement data during the measurement phase.

16. The system according to claim 11, wherein the control unit is further configured to determine filter parameters for downstream processing.

17. The method according to claim 1, wherein the second numerical aperture is larger than the first numerical aperture, and the second measurement volume is smaller than the first measurement volume.

18. The method according to claim 1, wherein the second numerical aperture is smaller than the first numerical aperture, and the second measurement volume is larger than the first measurement volume.

19. The system according to claim 9, wherein the second numerical aperture is larger than the first numerical aperture, and the second measurement volume is smaller than the first measurement volume.

20. The system according to claim 9, wherein the second numerical aperture is smaller than the first numerical aperture, and the second measurement volume is larger than the first measurement volume.

* * * * *